US005584635A

United States Patent [19]
Stapelmann

[11] Patent Number: 5,584,635
[45] Date of Patent: Dec. 17, 1996

[54] CARRIAGE FOR A CONSTRUCTION PANEL

[76] Inventor: Frank Stapelmann, 5062 University Dr., Santa Barbara, Calif. 93111

[21] Appl. No.: 543,328

[22] Filed: Oct. 16, 1995

[51] Int. Cl.⁶ .................................................. B66F 9/12
[52] U.S. Cl. .................................................. 414/11
[58] Field of Search ........................ 269/905; 414/11, 414/673, 743; 212/302, 306

[56] References Cited

U.S. PATENT DOCUMENTS

| | | |
|---|---|---|
| 1,288,882 | 12/1918 | Hartough . |
| 1,753,480 | 4/1930 | Rocholl . |
| 1,765,985 | 6/1930 | McHaffie . |
| 2,291,474 | 7/1942 | Kalmbach .................... 280/61 |
| 2,398,584 | 4/1946 | Goodrich . |
| 2,421,123 | 5/1947 | Jensen ........................ 280/49 |
| 2,473,873 | 6/1949 | Fosbender ................... 280/44 |
| 2,503,388 | 4/1950 | Hedlund . |
| 2,558,404 | 6/1951 | Watson ...................... 144/296 |
| 2,574,825 | 11/1951 | Guild . |
| 2,576,016 | 11/1951 | Janusz ....................... 254/2 |
| 2,653,006 | 9/1953 | Lewis ........................ 254/131 |
| 2,663,929 | 12/1953 | Carpenter ................... 29/290 |
| 2,737,709 | 3/1956 | Lovelace .................... 29/290 |
| 2,774,134 | 12/1956 | Smith ........................ 29/286 |
| 2,899,084 | 8/1959 | Brunnemer . |
| 2,937,850 | 5/1960 | Winkler ...................... 254/8 |
| 2,959,309 | 11/1960 | Hopfeld . |
| 2,967,627 | 1/1961 | Vinson . |
| 2,989,286 | 6/1961 | Gillespie .................... 254/120 |
| 3,090,635 | 5/1963 | Masterson ................... 280/47.13 |
| 3,138,265 | 6/1964 | Hansen . |
| 3,151,897 | 10/1964 | Wagner ...................... 287/21 |
| 3,235,227 | 2/1966 | Toffolon ..................... 254/131 |
| 3,382,988 | 5/1968 | O'Reilly . |
| 3,458,056 | 7/1969 | Stefan et al. ................ 269/905 X |
| 3,467,405 | 9/1969 | Fogg ......................... 280/47.24 |
| 3,580,601 | 5/1971 | Miles ........................ 280/47.13 |
| 3,667,728 | 6/1972 | Garelick ..................... 254/8 |
| 3,822,023 | 7/1974 | Cordel ....................... 414/743 X |
| 3,828,955 | 8/1974 | Harkey . |
| 3,845,969 | 11/1974 | Nadeau ...................... 280/47.13 |
| 3,861,662 | 1/1975 | Morse ........................ 269/17 |
| 3,871,054 | 3/1975 | Schaefer ..................... 29/267 |
| 3,923,167 | 12/1975 | Blankenbeckler ............. 414/11 |
| 4,043,536 | 8/1977 | Almond ...................... 254/2 R |
| 4,050,671 | 9/1977 | Coleman ..................... 254/7 R |
| 4,189,276 | 2/1980 | Shaffer ...................... 212/302 X |
| 4,278,244 | 7/1981 | Carter ....................... 269/17 |
| 4,424,872 | 1/1984 | Granlind et al. ............. 414/673 X |
| 4,810,151 | 3/1989 | Shern ........................ 269/905 X |
| 5,464,315 | 11/1995 | Palmer et al. ............... 414/490 X |

*Primary Examiner*—Karen B. Merritt
*Assistant Examiner*—Janice L. Krizek
*Attorney, Agent, or Firm*—Kenneth J. Hovet

[57] ABSTRACT

A carriage has a wheeled base with an articulated frame for supporting a construction panel in a multitude of operator-defined orientations during transportation, fitting and installation of the panel. The frame and a construction panel secured to the frame are movable relative to the base between (a) a reclined transport position in which the center of mass of the construction panel overlies the area bounded by the wheels of the base to enhance stability of the carriage during transportation of the panel, and (b) an upright installation position in which the center of mass of the construction panel is located forwardly of the wheels of the base. In the installation position of the frame, transfer balls below the frame transfer the weight of a construction panel to the surface on which the carriage operates to enhance stability and facilitate rolling movement of the carriage. Independently operable elevators are provided on the frame for uniformly elevating the base and the frame and a construction panel secured to the frame while maintaining contact between the transfer balls and the operating surface. The elevators alternately are operable differentially for adjusting the angular orientation of the frame and construction panel secured to the frame. A laterally extendable strut on the base supports weight of the carriage when the carriage is in an overturned working position in which a construction panel secured to the frame rests on a side edge thereof.

12 Claims, 7 Drawing Sheets

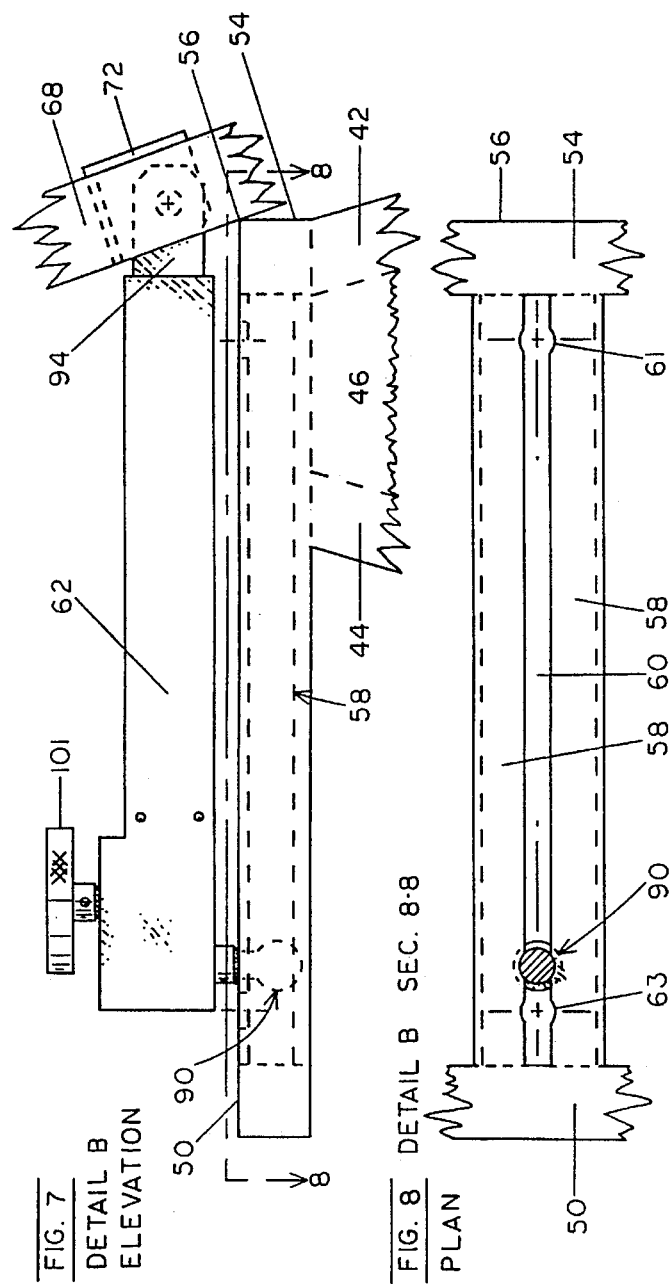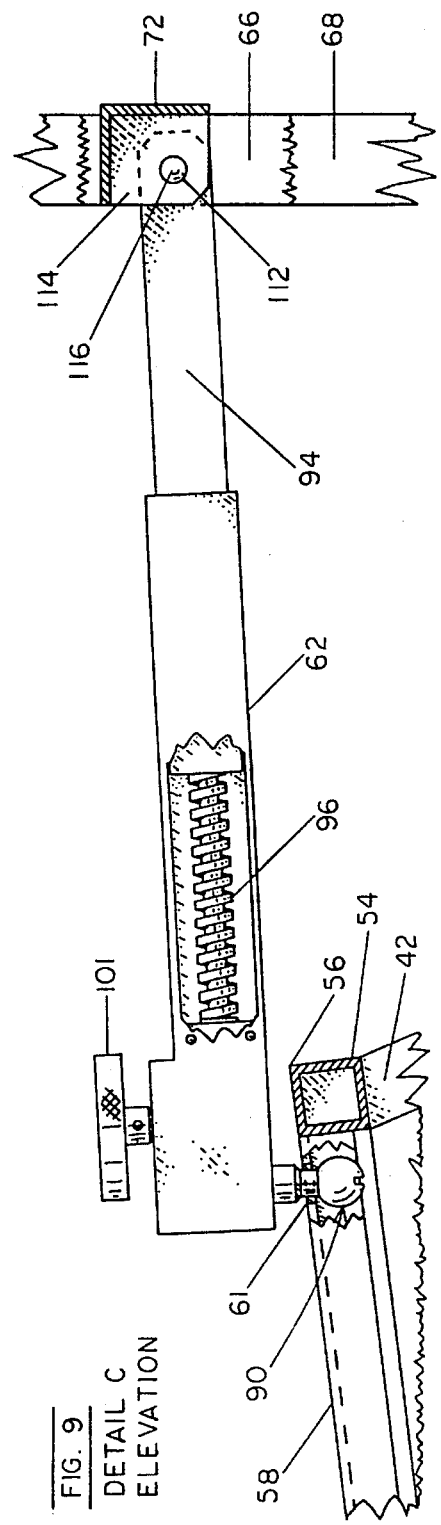

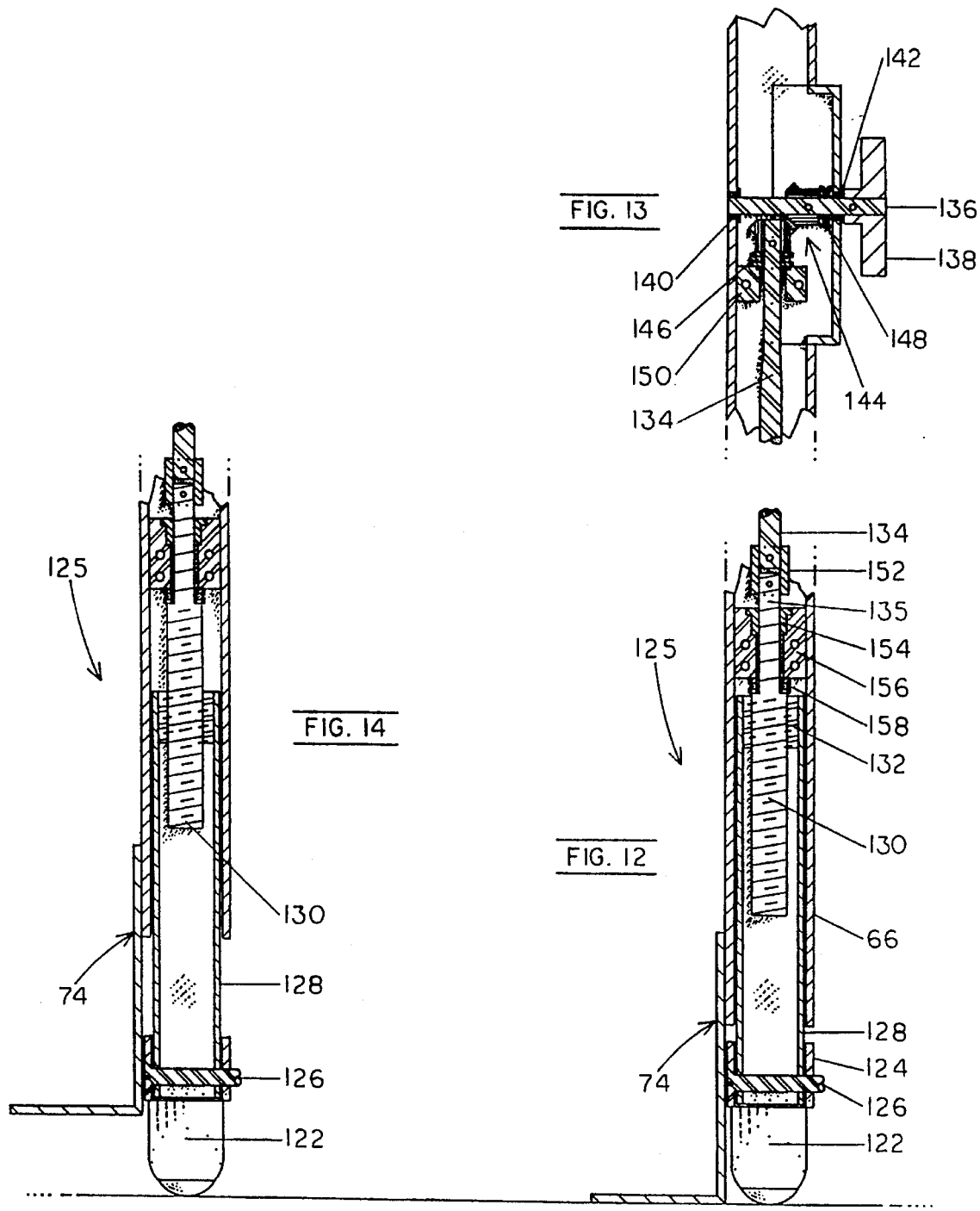

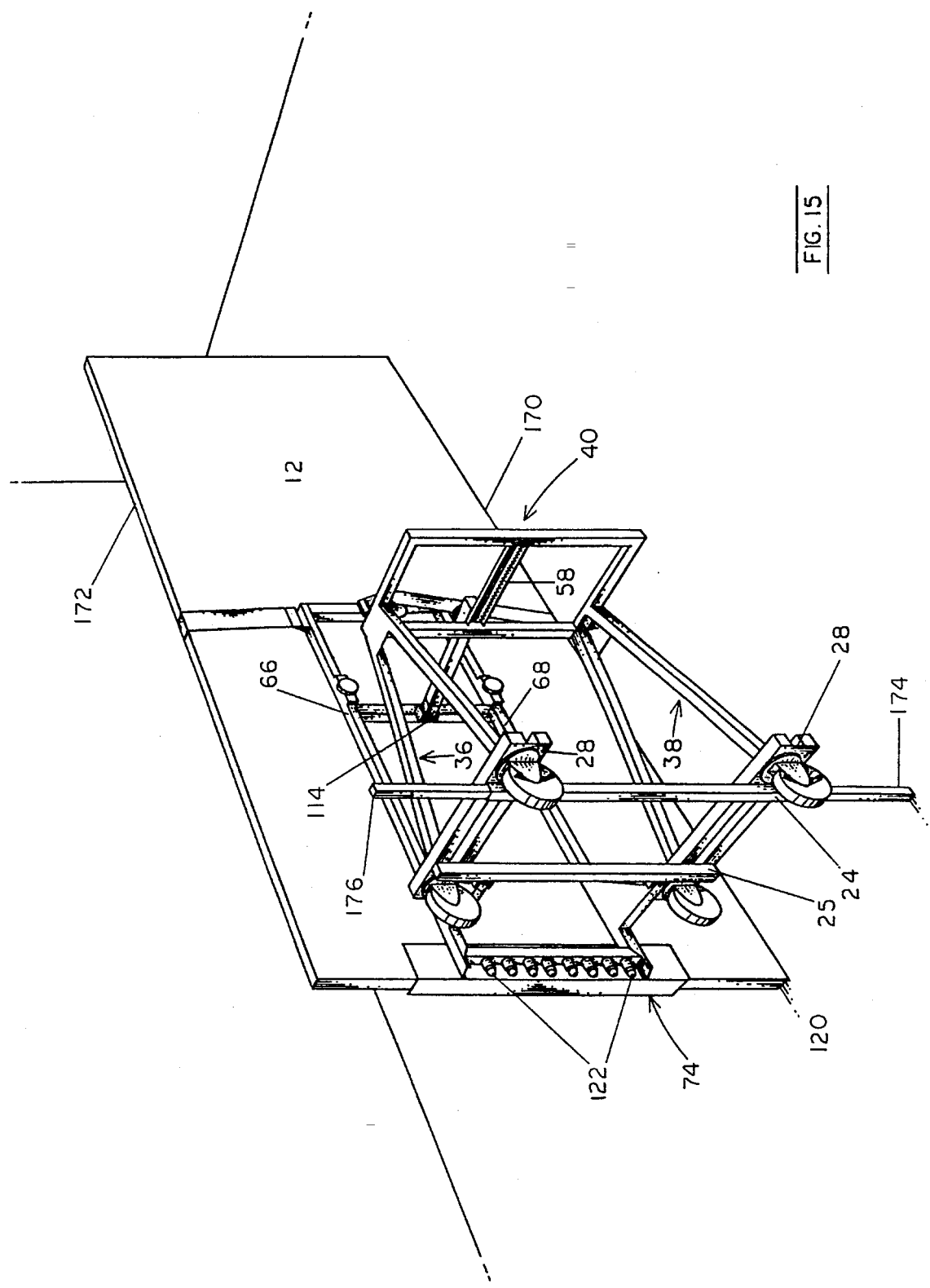

CARRIAGE FOR A CONSTRUCTION PANEL

BACKGROUND OF THE INVENTION

1. Field of the Invention

The present invention relates generally to a carriage and, more particularly, to a wheeled carriage for transporting, fitting and installing a construction panel.

2. Description of the Prior Art

Construction panels, such as the types of panels which are mounted as doors or plate glass windows, generally are quite heavy and awkward to handle, particularly during the fitting and installation stages of a construction process. As a consequence of the numerous problems and inconveniences associated with the cumbersome panels, a variety of devices have been proposed for facilitating panel handling operations. Such devices typically provide some type of rolling base upon which the weight of a substantially planar, relatively heavy panel is supported and rolled to the desired point of installation. The panel then is manually removed from the base and mounted in the desired orientation.

One prior art device is disclosed in U.S. Pat. No. 3,138,265 to Hansen, issued Jun. 23, 1964. Hansen has a door-carrying frame mounted on a wheeled base. A door panel rests on the frame and is supported alternately in either a reclined travel position or an upright installation position forward of the base. The shortcomings of Hansen are illustrative of the prior art and should be understood.

First, because Hansen suspends the center of mass of a panel carried on the frame forwardly of the base when the frame is upright, the Hansen device has limited stability when used in an installation mode of operation whereby the entire apparatus has a tendency to tip. The instability is particularly evident when attempting to move the device such as when moving a door panel toward a door jamb. This is because the weight of the panel and frame is cantilevered ahead of the wheels and the device consequently requires operator effort to prevent overturning of the base.

Also, Hansen fails to provide means for mechanically adjusting and maintaining the position of a panel carried on the frame when the frame is in position for installation of the panel. That is, the Hansen device is incapable of variably elevating or rotating a door panel when the frame is upright. These functions are important when attempting to align a door or other construction panel with a mounting location, such as when attempting to hold a door panel adjacent to a hinge location during installation.

Furthermore, it is advantageous when fitting a construction panel to be able to positively determine and quickly reestablish position adjustments of a panel. Reestablishing the fitted position is especially helpful in applications where a door or window panel is temporarily moved away from a mounting site for additional working after fitting or in applications where multiple panels are to be installed. Hansen does not have means for positively determining or quickly reestablishing variable position adjustments of a panel carried on a frame.

For instance, when mounting hardware to a door panel, it is desirable to operate on the door panel after the door panel has been aligned with the intended installation location and while the door panel remains on the frame. The panel handling device disclosed by Hansen can be placed in an overturned configuration in which the device functions alternatively as a type of work bench. However, Hansen lacks means for securing a construction panel to the frame or for otherwise maintaining the position of a construction panel relative to the frame. As such, the carriage and panel must be re-aligned with the intended installation location which further increases the amount of time required for the construction process. Thus, there is a continuing need for an improved carriage for a construction panel wherein all of the above issues are considered and addressed.

SUMMARY OF THE INVENTION

The present invention overcomes the above disadvantages by providing a wheeled base and an articulated frame on the base for supporting a construction panel in a multitude of operator-defined orientations during transportation, fitting and installation of the panel. The frame and a construction panel secured to the frame are movable relative to the base between (a) a reclined transport position in which the center of mass of the construction panel overlies the area bounded by the wheels of the base to enhance stability of the carriage during transportation of the panel, and (b) an upright installation position in which the center of mass of the construction panel is located forwardly of the wheels of the base.

In the installation position of the frame, roller bearing means below the frame transfer a portion of the weight of a construction panel secured to the frame to the surface on which the carriage operates. The weight of the panel is supported forwardly of the base to enhance stability and facilitate omni-directional rolling movement of the carriage. The roller bearing means, shown as multiple transfer balls, are arranged in a row and can be spaced less than about two inches from the line of action of the weight force of a construction panel secured to the frame when the frame is in an upright position.

Independently operable elevators are provided on the frame for uniformly elevating the base and the frame and a construction panel secured to the frame while maintaining contact between the transfer balls and the operating surface. The elevators are operable differentially for adjusting the roll angular orientation of the base and the frame and a construction panel secured to the frame. A telescoping arm on the base is provided for adjusting the pitch angular orientation of the frame relative to the base when a construction panel secured to the frame is in an upright position.

The carriage has an overturned working position in which a construction panel secured to the frame rests on the floor along a side edge thereof. A laterally extendable strut on the base supports a portion of the weight of the carriage when the carriage is overturned. A plurality of manually operated position control mechanisms retain the fitted position of a construction panel relative to the base so that the panel can be quickly and precisely returned to the fitted position after being worked in the overturned condition of the carriage.

It is envisioned that hydraulics, pneumatics or electric motors may be used to drive the hand operated positioning mechanisms featured in the above and following descriptions. It also is envisioned that the welded steel structure of the carriage and frame as described, taken separately or collectively, may be constructed of cast joints and tubing, metal or plastic (thereby requiring little or no welding), or stamped metal parts.

It is therefore an object of the invention to provide a carriage having enhanced stability of movement and control of a construction panel secured to the carriage. The described stability is substantially independent of human leverage and so facilitates hands-free operation by the craftsman.

A further object of the invention is to provide a carriage capable of moving omni-directionally during transportation, fitting, and installation of a construction panel. The present invention is uniquely adapted to provide such a benefit even when a construction panel secured to the carriage is held in a substantially vertical orientation.

A further object of the invention is to provide a carriage having the capability of positioning a construction panel secured to the carriage about three translational degrees of freedom and three rotational degrees of freedom.

A further object of the invention is to provide a carriage usable for installing a construction panel and the like whereby once the panel initially is placed on the carriage and secured by the craftsman, the panel need not be removed from the carriage until installed in final position. To this end, a feature of the invention is the ability to function alternatively as a work bench for operating on a panel secured to the carriage, such as for marking or trimming a door panel secured to the carriage, without removing the panel from the carriage.

Yet another objective of the invention is to ensure repeatability of positioning of a panel secured to the carriage. After a construction panel is appropriately fitted to a mounting location, the carriage and construction panel are moved away from the mounting location and the panel is prepared for installation, such as by attaching hinges to a door panel. Once prepared for installation, the carriage and panel subsequently are returned to the substantially exact same position as when the panel was fitted.

These and other features and objects of the invention will become apparent from the following detailed description when taken in conjunction with the accompanying drawings and claims. It should be understood that the foregoing general description and the following detailed descriptions are exemplary and explanatory only and should not be taken as restrictive of the invention.

BRIEF DESCRIPTION OF THE DRAWINGS

FIG. 7 is an enlarged elevational view showing Detail B in FIG. 4.

FIG. 8 is a plan view taken along lines 8—8 in FIG. 7.

FIG. 9 is an enlarged elevational view showing Detail C in FIG. 5.

FIG. 12 is an enlarged sectional view taken along lines 12—12 in FIG. 10.

FIG. 13 is an enlarged sectional view taken along lines 13—13 in FIG. 10.

FIG. 14 is an enlarged sectional view taken along lines 14—14 in FIG. 11.

FIG. 15 is a perspective view of the carriage shown in FIGS. 1–3 in which the frame and a construction panel secured to the frame are in an overturned, working position.

DESCRIPTION OF THE PREFERRED EMBODIMENTS

Figure 1:
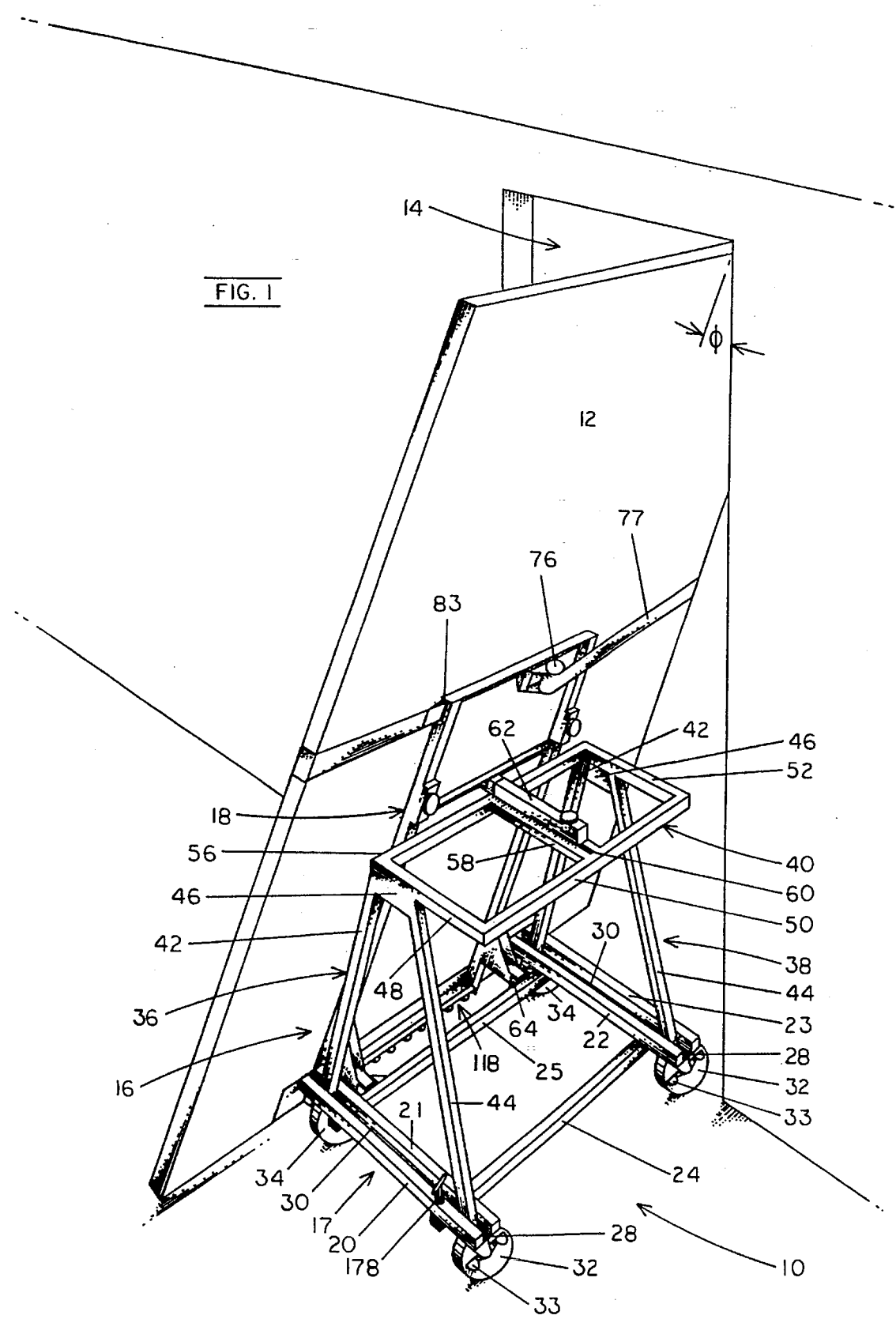
FIG. 1 is a perspective view of a carriage according to the present invention in which the frame and a construction panel secured to the frame are in a reclined, transport position.
Figure 2:
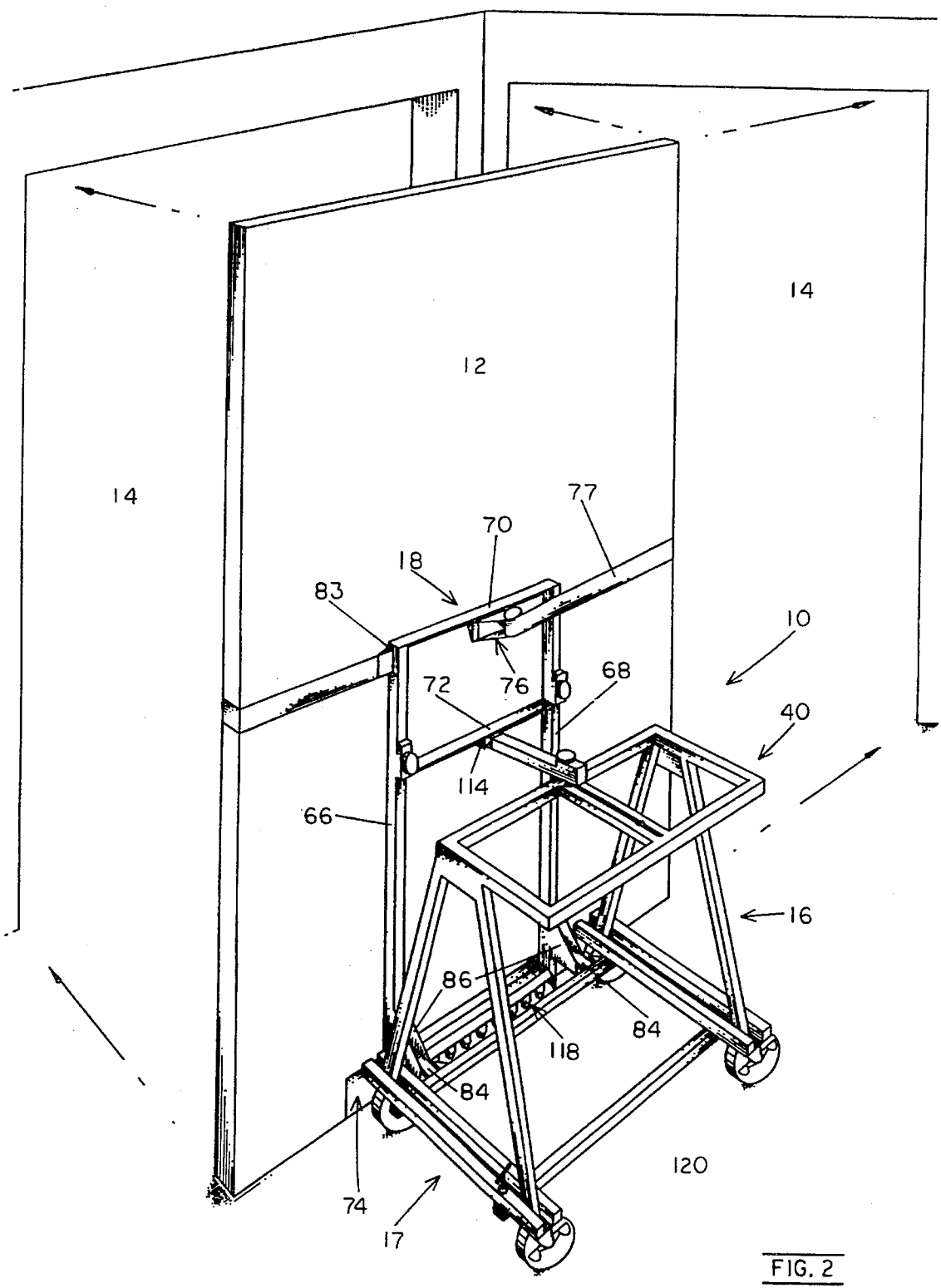
FIG. 2 is a perspective view of the carriage of FIG. 1 in which the frame and a construction panel secured to the frame are in an upright, installation position.

With reference now to FIGS. 1–2 of the drawings, a carriage according to the present invention is generally designated with numeral 10. As shown in FIG. 1, the carriage 10 is configured for transporting a construction panel 12, such as a door panel, through a doorway 14. In FIG. 2, the carriage 10 is configured for fitting and installing the construction panel in a doorway. As described further below, the carriage 10 is uniquely adapted to support a construction panel in a multitude of operator-defined orientations to facilitate transportation, fitting and installation of the panel during a construction process. The carriage 10 further is suited to carry a variety of construction materials, such as generally planar panels made of window glass or wall board, and no interpretation of the following is intended to suggest or imply that use of the carriage 10 is limited to applications involving doors.

As shown in FIGS. 1–2, the carriage 10 has a base 16 and an articulated frame 18 mounted on the base 16 for carrying a construction panel 12. The base has a dolly 17 comprising two pairs 20,21 and 22,23 of spaced apart support members joined together by underlying cross rails 24 and 25. The support members in each pair are arranged in a parallel spaced apart relationship with each other to define an open channel 30 between each pair. Opposing ends of the cross rails 24,25 are suitably welded or otherwise secured to respective ones of the support members to provide a rigid generally polygonal-shaped platform for the base.

The overall base 16 preferably is formed from a plurality of rigid elements suitably interconnected by generally known means, such as welding or bolting, to define a robust truss design which is substantially resistant to sway and instability. In the exemplary embodiment, the base is formed from welded steel tubing having a generally square cross-section with a maximum cross-sectional dimension of about 1 and ¼ inches and a wall thickness selected to provide a desired load carrying capacity for the overall carriage 10.

A caster 32 with brake 33 is secured to the dolly 17 near the trailing end of each pair of support members. A caster 34 is secured to the dolly 17 near the leading end of each pair of support members. Each of the casters are pivoted to a caster plate 28 which is secured to the underside of each pair of support members at the aforementioned leading and trailing ends. The casters 32 and 34 define a four-point rolling support for the base in which the casters are advantageously located near corner extremities of the base to enhance stability of the carriage.

Superstructure of the base 16 includes a pair of spaced apart A-frames 36 and 38 supported on the dolly 17. The A-frames are generally coextensive with a transverse upper structure 40 extending between upper ends of the A-frames. In the exemplary embodiment, the superstructure of the base is also formed from the aforementioned welded steel tubing having a generally square cross-section.

The A-frames 36 and 38 are substantially identical and each have a pair of symmetrically skewed rails 42 and 44 joined at their upper ends by a web portion 46. Lower ends of the skewed rails 42 and 44 are received within respective channel openings 30 between the spaced-apart support members and are suitably affixed thereto.

The upper structure 40 has four rails arranged in a generally polygonal configuration with first end rail 48 overlying and extending rearwardly of the apex of the A-frame 36. Second end rail 52 overlies and extends rearwardly of the apex of the A-frame 38. Handle rail 50 extends transversely between the trailing end of the rails 48 and 52 and defines a means for grasping and manipulating the carriage.

Forward rail 54 extends transversely between the leading end of the rails 48 and 52 and defines a reclined support surface 56 against which the panel-carrying frame 18 rests when the carriage 10 is configured as shown in FIG. 1. The support surface 56 is inclined from a vertical plane so that panel 12 forms an acute angle φ with the vertical side of doorway 14. This will permit transport of a reclined panel of standard dimension through the doorway.

A guide rail 58 extends approximately mid-span between handle rail 50 and forward rail 54 and has an elongated slot 60 in the upper surface thereof for guiding fore/aft movement of a holdback arm 62 on the frame 18.

Two spaced apart pairs of forwardly opening brackets 64 extend outwardly from opposing ends of the forward face of cross rail 25. They are used for mounting the frame 18 on the base 16, as described below.

The frame 18 has a pair of spaced apart side rails 66 and 68 joined together at their upper portions by top frame part 70 and upper frame part 72. The side rails are joined together at their lower portions by a base member 74. The base member 74 has a forwardly extending flange 75 for engaging an edge of a construction panel 12 when placed upon the carriage.

A ratchet 76 and strap 77, each of generally known construction, are mounted on the top frame part 70 for securing a construction panel to the frame 18. An up-turned hook 83 on side rail 66 serves as an attachment point for a looped end of the strap 77. An alternative embodiment of the invention envisions that a second strap could be used to balance a construction panel in its position on the frame 18, such as an oppositely wrapped strap which is tightened, for example, with a second ratchet. In addition, other known means, such as vacuum cups, clamps, elastic bands and the like, are alternative means anticipated by the invention for securing a construction panel to the frame.

Figure 3:
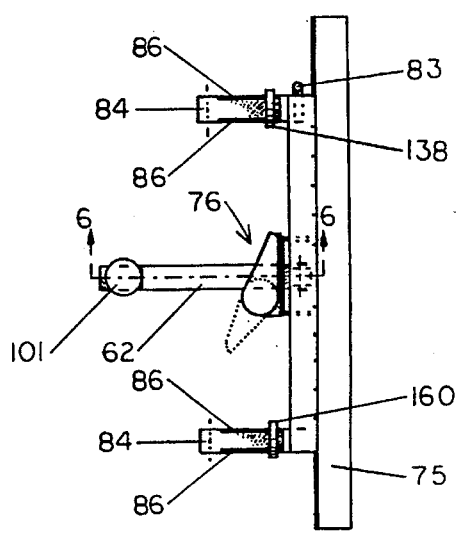
FIG. 3 is a top plan view of the frame of FIG. 1 without a construction panel.

A pivot strut 84, flanked by a pair of gusset plates 86 (see also FIGS. 3, 4 and 5), is provided near the lower end portion of each of the side rails 66 and 68. Each pivot strut 84 extends rearwardly from a respective side rail to a distal end which is received in corresponding ones of the brackets 64 on cross rail 25. Base pivot pins 88 are inserted through aligned openings in the pivot struts 84 and openings in the corresponding pairs of the brackets for defining a substantially horizontal axis about which the frame 18 is rotatable relative to the base 16.

The holdback arm 62 defines a first positioning means for rotating the frame 18 about the pivot pins 88 (see FIGS. 6–9). Particularly, the holdback arm 62 has a ball member characterized as comprising a circular boss portion 91 which has a diameter greater than elongated slot 60 but less than upright opening 61 and recline opening 63. The boss portion extends into a throat portion 92 which has a diameter less than elongated slot 60.

The throat portion merges into an enlarged bulbous end 93 which has a diameter greater than the diameter of the upright and recline openings. With the above geometrical configurations, the holdback arm will always remain slidably connected to the guide rail 58 while the boss portion may be repeatably engaged or disengaged with the upright and recline openings. When the boss 91 is in the recline opening 63, the holdback arm 62 will be in a retracted position in which the frame 18 is in the reclined transportation position illustrated in FIG. 1. When boss 91 is in the upright opening 61, the holdback arm will be in an extended position in which the frame 18 is in the upright installation position shown in FIG. 2.

It may be noted that in the reclined transportation position, the center of mass of a construction panel 12 secured to the frame overlies the area bounded by the casters 32 and 34. This arrangement enhances the stability of the carriage 10 during transportation of the panel. In the upright installation position shown in FIG. 2, the center of mass of a construction panel 12 is located forwardly of the area bounded by the casters 32 and 34.

Figure 6:
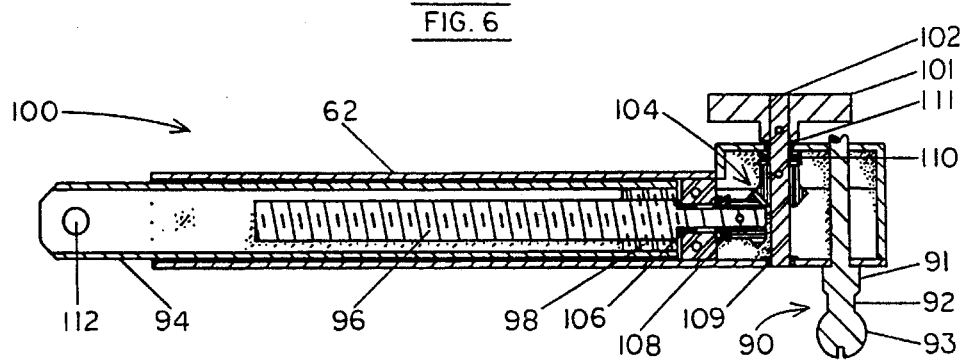
FIG. 6 is a sectional view taken along lines 6—6 in FIG. 3.

Second positioning means, generally designated by numeral 100 in FIG. 6, is provided for adjusting the position of the frame 18 about the base pivot pins 88 while the holdback arm 62 remains fixed relative to the base 16. A telescoping member 94, contained within the holdback arm 62, is coupled to an internal drive shaft 96 by a threaded nut 98. The drive shaft 96 and the nut 98 have a complementary thread construction and, in a preferred embodiment, the drive shaft 96 and the nut 98 have an Acme thread construction.

Power is manually transmitted to the drive shaft 96 by a control knob 101 mounted on an input shaft 102 and through a bevel gear set 104. A reduced diameter end of the drive shaft 96 is supported within the holdback arm 62 by arm bearings 106 and 108, and the input shaft 102 is supported within the holdback arm 62 by shaft bearings 109, 110 and 111. The free end of telescoping member 94 is provided with opening 112. It is received within a pivot part 114 on the underside of the upper frame part 72. Frame pivot pin 116 is used to interconnect pivot opening 112 with pivot part 114.

Operation of the first and second frame positioning means is distinguished as follows. Lifting the boss portion 91 out of engagement with either of the recline or upright openings in slot 60 and moving the holdback arm in fore/aft directions along the slot, results in rotation of the frame 18 between the reclined travel position (FIG. 1) and the upright installation position (FIG. 2). In distinction, rotation of the control knob 101 turns the input shaft 102 and, via the bevel gear set 104, turns the drive shaft 96. The drive shaft is fixed longitudinally within the holdback arm 62 so that rotation of the input shaft causes nut 98 and the telescoping member 94 to move axially relative to the holdback arm. Extension and retraction of the shaft 94 thereby controls variable fine adjustment of the angular orientation of the frame 18 about the base pivot pins 88 while the holdback arm 62 remains stationary relative to the base 16.

Figure 10:
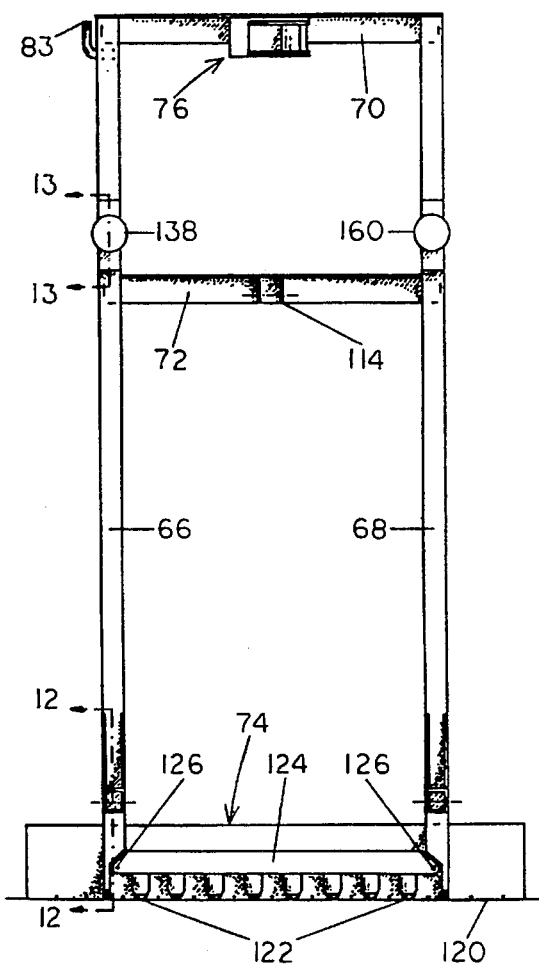
FIG. 10 is a rear elevational view of the frame shown in FIGS. 1–3.

Roller bearing means, generally designated by numeral 118 in FIG. 2, are provided below the frame 18 for transferring at least a portion of the weight of a construction panel carried by the frame 18 to a floor surface 120 on which the carriage 10 operates when the frame is in the upright, installation position. More particularly, and referring also to FIGS. 10 and 11, a plurality of transfer balls 122, such as spherical bearings, are mounted on a transfer bar 124 which extends between lower ends of the frame side rails 66 and 68.

Each end of the transfer bar 124 is pivoted to the lower end of an extendable lift, or elevator 125, located within a corresponding one of the side rails 66, 68. The elevators are substantially identical and are illustrated in FIGS. 12–14 with respect to the elevator located within side rail 66.

More specifically, a pivot fastener 126 connects the transfer bar 124 at an end thereof to an elongated drive output member 128. The drive output member 128 is contained within the frame side rail 66 and is coupled to an elevator drive shaft 130 by a threaded nut elevator 132. The drive shaft 130 and the nut 132 have a complementary thread construction and, in a preferred embodiment, the drive shaft 130 and the nut 132 have an Acme thread construction.

Power is transmitted manually to the drive shaft 130 by an intermediate shaft 134 and a transverse input shaft 136 operated by elevator control knob 138. The input shaft 136 is supported on opposite wall portions of the side rail 66 by input bushings 140 and 142. An elevator bevel gear set 144 transfers torque from the input shaft 136 to the intermediate shaft 134. Mating ends of the shafts 134 and 136 are supported on rail thrust bearings 146 and 148, respectively. The upper end of the intermediate shaft 134 is further supported within side rail 66 by a rail bushing 150.

The lower end of the intermediate shaft 134 is coupled to a reduced-diameter upper end 135 of the drive shaft 130 with a cylindrical pin connector 152. Upper end 135 of the drive shaft is further supported within side rail 66 by a shaft bushing 154 seated in a spacer 156 and by a shaft thrust bearing 158. The elevator located within side rail 68 has a manual elevator control knob 160 for actuating a drive mechanism in all respects substantially identical to the elevator described above with regard to the side rail 66.

Figure 4:
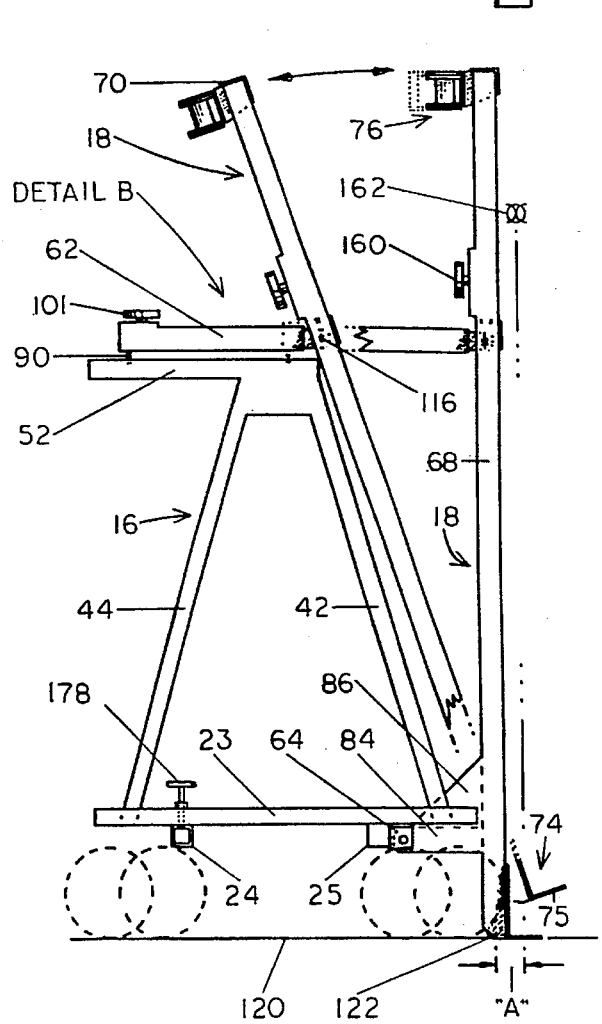
FIG. 4 is a right side elevational view of the carriage of FIGS. 1–3 showing the frame in alternative positions.

The roller bearing means 118 and the elevators interconnected between the articulated frame 18 and the transfer bar 124 provide a number of important advantages as follows:

With reference to FIG. 4, when frame 18 is in the upright installation position, the center of mass of a construction panel secured to the frame (represented by the symbol designated by numeral 162 in FIG. 4) is located forwardly of the area bounded by the casters 32, 34. Exposed portions of the transfer balls 122 define a substantially straight line contact with the operating floor surface 120 forwardly of the base 16 for supplementing the multi-point support defined by the casters 32, 34. Notably, support provided by the transfer balls 122 occurs at a distance "A" from the line of action of the weight force of an upright construction panel secured to the frame 18. This arrangement enhances stability of the loaded carriage during installation of a construction panel. Most commonly, the distance "A" will be about equal to or less than the thickness of the panel. In a preferred embodiment, the distance "A" is about one and one-half inches when a construction panel having a thickness of one-and one-half inches is carried on the frame 18.

In addition, the fact that the load bearing function achieved by the transfer balls 122 accommodates rolling contact further enhances operation of the carriage 10. That is, in addition to providing improved static support and stability of the carriage, the transfer balls provide supplemental stabilizing support while permitting the loaded carriage to be easily rolled forward, rearward, and laterally in an upright position. This feature is particularly useful when controlling fine adjustment of a relatively heavy, upright object into an installation position.

The control knobs 138 and 160 are independently operable. This feature permits synchronous or, in the alternative, differential extension of the associated elevators contained on the frame 18 for elevating the base 16, the frame 18, and a panel 12 secured to the frame.

Figure 5:
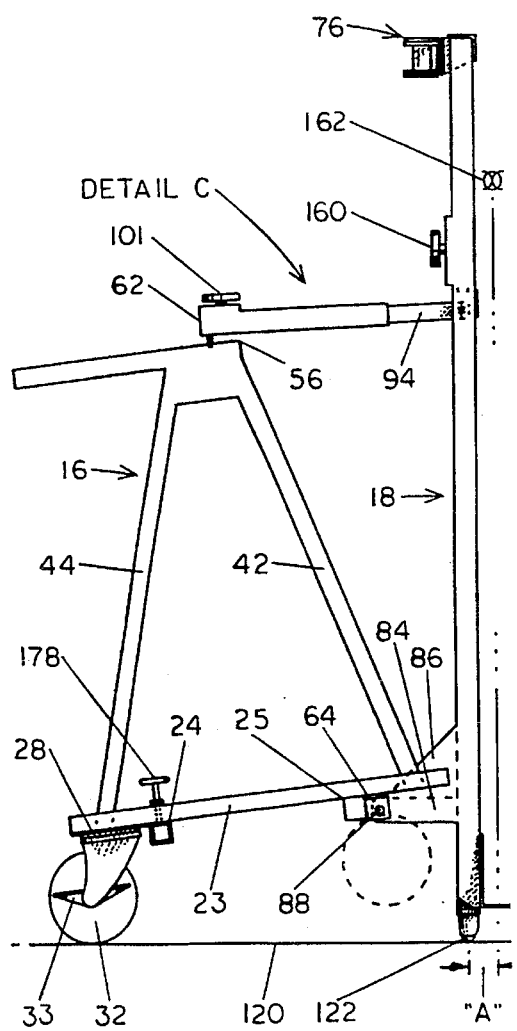
FIG. 5 is a view similar to that illustrated in FIG. 4 with the frame and front portion of the base elevated.

In the synchronous mode of operation, the control knobs 138 and 160 are manually operated so that the input shaft 136, the intermediate shaft 134, and the drive shaft 130 uniformly rotate within each corresponding one of the side rails 66 and 68. The drive shaft 130 is fixed axially within each rail so that rotation of the input shaft 136 causes the corresponding elevator nut 132 and the output member 128 to travel axially relative to the lower end of the drive shaft 130. Uniform extension and retraction of the output members 128 thereby results in lifting, and alternatively lowering, of the articulated frame and base. The transfer balls 122 remain in contact with the operating floor surface while the construction panel is lifted. They also maintain a stable, rolling support for the carriage 10 during fitting and installation of the construction panel. FIG. 5 illustrates the configuration of the carriage 10 when the frame and base are elevated in a uniform mode of operation of the elevators.

Figure 11:
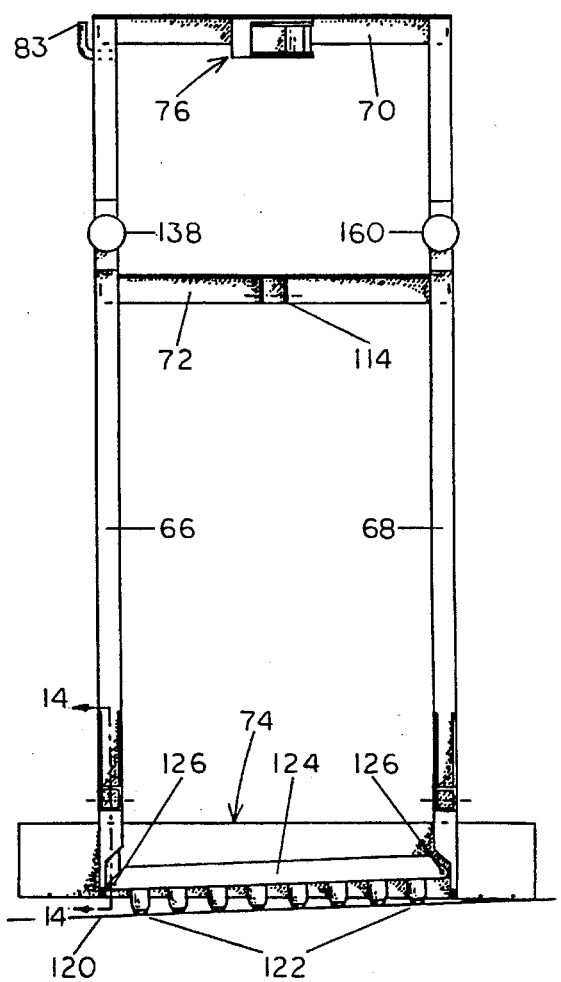
FIG. 11 is a view similar to that illustrated in FIG. 10 with the elevators extended differentially.

The control knobs 138 and 160 and associated drive mechanisms also have a differential mode of operation in which the elevator contained in the side rail 66 is extended to a different length than the elevator contained in the side rail 68. As shown in FIG. 11, this may occur while a simultaneous unitary roll displacement of the base and frame is achieved relative to the operating floor surface. Differential operation of the elevators thus results in rotation of a construction panel 12 within the substantially vertical plane defined by the panel when the frame and panel are in the upright, installation position. Similar to the uniform lifting mode of operation described above, the transfer balls remain in contact with the operating floor surface 120 even while the carriage is moved during fitting and installation of a construction panel 12.

The carriage 10 is also adapted for use as a work bench and has an overturned working position (FIG. 15) in which a construction panel 12 secured to the frame 18 rests in a substantially horizontal orientation on a side edge 170. This orientation is helpful in relation to routing and attachment of hinges to a door panel edge. In FIG. 15, this is shown as upper edge 172.

As illustrated in FIG. 15, the carriage is overturned toward one side with A-frame 38 spaced above the operating floor surface 120 and beneath A-frame 36. A telescoping strut 174 is located within cross rail 24 of the base and is extended prior to overturning the carriage. In this way, the strut 174 will provide an offset support means for holding the panel in a side edge working position. A similar opposing strut 176 is located within the opposite end of cross rail 24. It is extended axially from the opposite end of the rail when it is desired to overturn the carriage opposite to the direction shown in FIG. 15.

A set screw 178 (one shown in FIG. 1) is provided at each end of the cross rail 24 and extends through respective corresponding portions of support member 20,23. The set screws retain the struts 174 and 176 within rail 24 during upright use of the carriage. The set screws also lock the struts at a desired extension when the carriage 10 is used in the work bench mode of operation.

While it is believed to be evident from the foregoing, the present invention provides a superior level of stability when moving an upright construction panel in any combination of three translational and three rotational independent degrees of freedom. The transfer balls uniquely support the weight of a construction panel on the ground or a floor surface forward of base 16. This feature overcomes the tipping tendency of previous cantilevered frame designs. Use of the twin-elevator lifting mechanism results in lifting of the entire carriage from the ground (rather than merely lifting the frame from the carriage) and maintains contact between the transfer balls and the ground, thereby enhancing steadiness of the carriage when a construction panel is elevated.

The degree to which a construction panel can be controllably positioned ensures a proper fit and installation. Elevation, tipping, and rolling of the panel are precisely controlled by independent drive mechanisms located within the holdback arm 62 and the frame side rails 66 and 68.

Controlled positioning of the frame relative to the base permits the carriage and a construction panel to be moved away from a mounting location for additional working of the panel. And, the panel can be subsequently returned to the exact mounting location since fine adjustment of the panel is retained by the various described drive mechanisms. Repeatability of fitting is thereby facilitated and the construction process is expedited.

Repeatability of fitting is particularly advantageous in view of the work bench-mode of the carriage 10. When it is desired to work the edge of a construction panel secured to the frame, the appropriate strut 174 or 176 is extended from cross rail 24 and the carriage is overturned to expose the panel edge for working. Upon completion of the work, the carriage is righted and rolled to the mounting location. Because the frame and a construction panel are secured relative to the base during fitting, the construction panel is precisely oriented relative to the mounting site.

Alternate forms of the invention also are envisioned. For example, it is anticipated that the base of the carriage could have a generally Z-shaped side view in which the skewed rails 42 of the A-frames are omitted and the dimensions and material of the remaining structural members are selected to provide acceptable strength in the overall carriage.

Other forms of the invention envision the use of alternative means for actuating the drive members located within the holdback arm 62 and the frame side rails 66 and 68. Electric motors, hydraulic drives, and pneumatic drives are exemplary of alternative drive means.

While the invention has been described with respect to preferred embodiments, it will be clear to those skilled in the art that modifications and improvements may be made to the invention without departing from the spirit and scope of the invention. Therefore, the invention is not to be limited by the specific illustrative embodiments, but only by the scope of the appended claims.

I claim:

1. A carriage for a construction panel comprising:

a base having means for defining a multi-point rolling support;

a frame with a lower end portion for engaging one edge of a construction panel;

means for coupling the frame to the base so that the frame is movable relative to the base;

an extendable lift on the frame for elevating the base and the frame and a panel secured to the frame, said extendable lift comprising a pair of independently operable elevators which are operable uniformly for elevating the base and the frame and a panel secured to the frame; and, positioning means independent from said elevators for rotating the frame and a panel secured to the frame relative to the base.

2. The carriage of claim 1 in which the elevators are operable differentially for rotating the base and the frame and a panel secured to the frame.

3. A carriage for a construction panel comprising:

a base having means for defining a multi-point rolling support;

a frame with a lower end portion for engaging one edge of a construction panel and an upper end portion adapted to secure a construction panel to the frame;

means for coupling the frame to the base so that the frame and a panel secured to the frame are rotatable relative to the base about a first axis whereby the panel can be placed in a position which defines a substantially vertical plane; and means on the frame for rotating a panel secured to the frame within said substantially vertical plane about a second axis comprising a pair of spaced apart elevators on the frame, the elevators being operable differentially for rotating the base and the frame and a panel secured to the frame about said second axis.

4. The carriage of claim 3 in which the elevators are operable uniformly for elevating the base and the frame and a panel secured to the frame.

5. In a carriage for a construction panel comprising a base having means for defining a multi-point rolling support, a frame with a lower end portion for engaging one edge of a construction panel and an upper end portion adapted to secure a construction panel to the frame, and means for coupling the frame to the base so that a construction panel secured to the frame is held in a substantially upright orientation in which the center of mass of the panel is located forwardly of an area bounded by said rolling support, the improvement comprising bearing means below the frame for transferring at least a portion of the weight of a construction panel secured to the frame to a surface on which the carriage operates; and extendable lift means connected between said bearing means and the frame for elevating the base and the frame and a panel secured to the frame while maintaining contact between the bearing means and the operating surface.

6. The carriage of claim 5 in which the frame and a panel secured to the frame are movable relative to the base between a reclined transport position in which the center of mass of the construction panel overlies the area bounded by the multi-point rolling support to enhance stability of the carriage during transportation of the panel, and an upright installation position in which the center of mass of the construction panel is located forwardly of the area bounded by the multi-point rolling support.

7. The carriage of claim 5 in which said bearing means comprises a plurality of rotatable elements journaled below the lower end of the frame and arranged in a row for engaging the operating surface forward of said rolling support when the frame is placed in the upright position thereof, when the frame is in the upright position thereof the distance between said row and the line of action of the weight force of a panel secured to the frame is about equal to or less than the thickness of said panel.

8. The carriage of claim 5 in which the extendable lift means comprise a pair of spaced apart independently operable elevators.

9. A carriage for fitting and installing a generally rectangular construction panel having spaced apart side edges and oppositely posed end edges extending between the side edges, the carriage comprising:

a base having means for defining a multi-point rolling support;

a frame on the base with a lower end portion for engaging an end edge of a construction panel at a location spaced inwardly from the side edges of the panel;

means cooperating with the frame for securing a construction panel to the frame so that the panel remains stationary relative to the base when the carriage is moved between an upright installation position and an overturned working position in which the construction panel rests in a substantially vertical orientation on a side edge thereof;

a laterally extendable strut on the base for supporting at least a portion of the weight of the carriage when the carriage is in the overturned working position;

means on the frame for placing the frame and a construction panel secured to the frame in a fitted position relative to a mounting location when the frame is upright and prior to moving the carriage to the working position thereof, and means for facilitating return of the construction panel to said fitted position after the carriage has been placed in the overturned working position thereof; and, means on the frame for elevating the base and the frame and a panel secured to the frame to place the panel in said fitted position.

10. The carriage of claim 9 in which the frame and a panel secured to the frame are movable relative to the base between a reclined transport position in which the center of mass of the construction panel overlies the area bounded by the multi-point rolling support to enhance stability of the carriage during transportation of the panel, and an upright installation position in which the center of mass of the construction panel is located forwardly of the area bounded by the multi-point rolling support.

11. A carriage for fitting and installing a generally rectangular construction panel having spaced apart side edges and oppositely posed end edges extending between the side edges, the carriage comprising:

a base having means for defining a multi-point rolling support;

a frame on the base with a lower end portion for engaging an end edge of a construction panel at a location spaced inwardly from the side edges of the panel;

means cooperating with the frame for securing a construction panel to the frame so that the panel remains stationary relative to the base when the carriage is moved between an upright installation position and an overturned working position in which the construction panel rests in a substantially vertical orientation on a side edge thereof;

a laterally extendable strut on the base for supporting at least a portion of the weight of the carriage when the carriage is in the overturned working position;

means on the frame for placing the frame and a construction panel secured to the frame in a fitted position relative to a mounting location when the frame is upright and prior to moving the carriage to the working position thereof, and means for facilitating return of the construction panel to said fitted position after the carriage has been placed in the overturned working position thereof; and, means on the frame for rotating the frame and a panel secured to the frame relative to the base about a first axis to place the panel in said fitted position.

12. The carriage of claim 11 including means on the frame for rotating the base and the frame and a panel secured to the frame about a second axis to place the panel in said fitted position.

\* \* \* \* \*